Patented Nov. 28, 1944

2,364,024

UNITED STATES PATENT OFFICE 2,364,024

DECORATIVE ARTICLE

Ralph F. Hayes, North Wilbraham, Mass., assignor to Monsanto Chemical Company, St. Louis, Mo., a corporation of Delaware No Drawing. Application May 16, 1940,
Serial No. 335,505

18 Claims. (Cl. 260—17)

This invention relates to plastic compositions comprising polystyrene and cellulose ethers relatively immiscible therewith.

It is well-known that certain compositions comprising synthetic resins and/or other high molecular weight substances lend themselves readily to the manufacture of articles possessing a highly decorative appearance. It has been found that a number of the color effects available in certain natural materials, which are exceptionally pleasing to the eye, are also desirable in said manufactured products. Among said color effects, there are two, more or less related and particularly desirable color effects, which are to be found in natural pearls and opals. Unfortunately, the colors of pearls and opals have tended to be extremely difficult and expensive to reproduce. Generally, special materials and processes have been required to impart these decorative effects to the plastic compositions of industry.

One object of this invention is to provide decorative articles comprising polystyrene and cellulose ethers relatively immiscible therewith. Another object is to provide compositions comprising polystyrene and cellulose ethers relatively immiscible therewith, said compositions possessing a lustrous, nacreous appearance resembling, for example, natural pearls and opals.

It is well-known to those skilled in the art that the addition, for example, of suitable fish scale material to cellulose ester compositions, imparts to said compositions an appearance simulating that of natural pearls. However, this fish scale material is very expensive and special processing conditions are required to produce compositions possessing said pearly appearance. For example, nacreous articles comprising polystyrene have been found difficult to produce by incorporating fish scale material therein.

However, by the process of the present invention, it has been found possible, without the necessity of special processing methods, to prepare decorative articles comprising polystyrene and possessing a decidedly attractive, nacreous and/or opalescent appearance. These highly valuable and unexpected results have been accomplished by incorporating cellulose ethers in polystyrene.

The cellulose ethers that produce these decorative effects when incorporated in polystyrene are the cellulose ethers of commerce and are characterized by relative immiscibility with polystyrene. Illustrative of the cellulose ethers that can be employed by this invention are methyl cellulose, ethyl cellulose, benzyl cellulose and the like.

The cellulose ethers are incorporated in the polystyrene by any suitable means but, preferably, by means of hot milling rolls under suitable milling conditions. A mixing period of substantially 20 minutes at a roll temperature of substantially 170° F. to 320° F. has been found suitable. The two components can be mixed in all proportions and still produce articles possessing the previously described decorative appearance. However, in order to impart to the article a strongly nacreous appearance, it is generally necessary that neither component be present in excess of substantially 90% by weight of the sum of the weights of the two components. Nevertheless, even when one component is present in excess of substantially 90% by weight of the sum of the weights of the two components, the products are still very attractive and those containing as little as 0.4 part by weight of one component for every 100 parts by weight of the other component have been found to be beautifully opalescent.

The following specific examples are illustrative of the present invention but are not limitative of the scope thereof. The parts are parts by weight.

Example 1

30 parts of commercial high viscosity ethyl cellulose, were incorporated in 100 parts of polystyrene, of such a degree of polymerization that a 10% toluol solution of said polystyrene possessed a viscosity of substantially 200 centipoises at 25° C. After milling for substantially 20 minutes on the mixing rolls at a roll temperature of substantially 190° F., the product was then suitably comminuted and molded by an injection molding process. An exceedingly striking, lustrous, nacreous appearance was imparted to the molded product.

Example 2

30 parts of commercial low viscosity ethyl cellulose were incorporated in 100 parts of polystyrene similar to that employed in Example 1. The method of incorporating the ethyl cellulose in the polystyrene was similar to that employed in Example 1 and the product obtained possessed a similar appearance.

The hereinbefore described specific examples of this invention have all illustrated the preparation of articles possessing a nacreous appearance by incorporating ethyl ethers of cellulose in polystyrene. However, as previously indicated, the scope of the present invention is not limited to these specific cellulose ethers. Thus, for example, such cellulose ethers as methyl cellulose, benzyl cellulose and the like may be substituted for ethyl cellulose in preparing these new decorative articles. Furthermore, cellulose ethers possessing other viscosities may be employed, according to this invention, and the degree of etherification of the cellulose is also subject to wide variation.

Other methods of incorporating the cellulose ethers in polystyrene may be employed by this invention and, furthermore, these new products are not limited to compositions comprising only one cellulose ether relatively immiscible therewith, but, if desired, a mixture of said cellulose ethers may be incorporated in polystyrene to form decorative articles. The mixtures of the two components do not have to be molded to bring out the pearly appearance; thus, calendering and other finishing processes may be employed. Dyes, pigments, fillers and other modifiers may be added as desired.

The present invention is limited solely by the claims attached hereto.

What I claim is:

1. A decorative article characterized by an opalescent appearance consisting essentially in polystyrene and a cellulose ether relatively immiscible therewith, physically intermixed with said polystyrene while in a heat softened condition to impart to the article a nacreous and pearlescent appearance.

2. A composition of matter characterized by an opalescent appearance consisting of polystyrene and a cellulose ether relatively immiscible therewith, physically intermixed with said polystyrene while in a heat-softened condition to give a nacreous and pearlescent appearance to said composition.

3. A decorative article characterized by an opalescent appearance consisting essentially in polystyrene and a cellulose ether relatively immiscible therewith, wherein neither component of said article is present in excess of substantially 90 per cent by weight of the sum of the weights of the two components, said cellulose ether being physically intermixed with said polystyrene while in a heat softened condition to impart to the article a nacreous and pearlescent appearance.

4. A decorative article characterized by an opalescent appearance consisting essentially in polystyrene and an ethyl cellulose relatively immiscible therewith, physically intermixed with said polystyrene while in a heat softened condition to impart to the article a nacreous and pearlescent appearance.

5. A nacreous composition of matter consisting essentially in polystyrene and an ethyl cellulose relatively immiscible therewith physically intermixed with said polystyrene while in a heat softened condition to impart a nacreous and pearlescent appearance to the composition.

6. A decorative article characterized by an opalescent appearance consisting essentially in polystyrene and a methyl cellulose relatively immiscible therewith, physically intermixed with said polystyrene while in a heat softened condition to impart to the article a nacreous and pearlescent appearance.

7. A nacreous composition of matter consisting essentially in polystyrene and a methyl cellulose relatively immiscible therewith, physically intermixed with said polystyrene while in a heat-softened condition to impart a nacreous and pearlescent appearance to the composition.

8. A decorative article characterized by an opalescent appearance consisting essentially in polystyrene and a benzyl cellulose relatively immiscible therewith, physically intermixed with said polystyrene while in a heat-softened condition to impart to the article a nacreous and pearlescent appearance.

9. A nacreous composition of matter consisting essentially in polystyrene and a benzyl cellulose relatively immiscible therewith, physically intermixed with said polystyrene while in a heat-softened condition to impart a nacreous and pearlescent appearance to the composition.

10. A process of preparing a decorative article characterized by an opalescent appearance which comprises heat softening and physically intermixing with polystyrene while in a heat-softened condition a cellulose ether relatively immiscible therewith to impart an opalescent appearance to said article, and then injection molding the resulting composition into the desired shape.

11. The process of preparing a decorative article characterized by an opalescent appearance which comprises heat softening and physically intermixing with polystyrene while in a heat-softened condition a cellulose ether relatively immiscible therewith to impart an opalescent appearance to said article, and then forming the resulting composition under pressure and elevated temperature into the desired shape, thus producing an article having a nacreous and pearlescent appearance.

12. The process of preparing a decorative article characterized by an opalescent appearance which comprises heat softening and physically intermixing with polystyrene while in a heat-softened condition a cellulose ether relatively immiscible therewith to impart an opalescent appearance to said article, wherein neither component of said article is present in excess of substantially 90 per cent by weight of the sum of the weights of the two components and then forming the resulting composition under pressure and elevated temperature into the desired shape, thus producing an article having a nacreous appearance.

13. The process of preparing a decorative article characterized by an opalescent appearance which comprises incorporating in polystyrene while in a heat-softened condition essentially only an ethyl cellulose relatively immiscible therewith to impart an opalescent appearance to said article, and then forming the resulting composition under heat and pressure into the desired shape.

14. The process of preparing a decorative article characterized by an opalescent appearance which comprises incorporating in polystyrene while in a heat-softened condition essentially only a methyl cellulose relatively immiscible therewith to impart an opalescent appearance to said article, and then forming the resulting composition under heat and pressure into the desired shape.

15. The process of preparing a decorative article characterized by an opalescent appearance which comprises incorporating in polystyrene while in a heat-softened condition essentially only a benzyl cellulose relatively immiscible therewith to impart an opalescent appearance to said article, and then forming the resulting composition under heat and pressure into the desired shape.

16. A composition of matter comprising polystyrene and a cellulose ether immiscible therewith physically intermixed with said polystyrene while in a heat-softened condition to give a nacreous and pearlescent appearance to said composition.

17. Process of producing a composition of matter having a nacreous appearance, which comprises physically intermixing while in a heat softened condition polystyrene and a cellulose ether relatively immiscible therewith to give a nacreous appearance to the resulting composition.

18. Process of producing an article having a nacreous appearance which comprises heat softening and physically intermixing while in a heat softened condition polystyrene and a cellulose ether relatively immiscible therewith to give a nacreous appearance to the resulting composition, then comminuting the resulting composition and injection molding said comminuted composition to produce said article.

RALPH F. HAYES.